Dec. 17, 1968   R. S. ZEBATH ET AL   3,416,186
POULTRY SHACKLE UNLOADING DEVICE

Filed June 21, 1966   3 Sheets-Sheet 1

INVENTORS.
Ralph S. Zebarth
Henry E. Frederick
BY John A. Hamilton
Attorney.

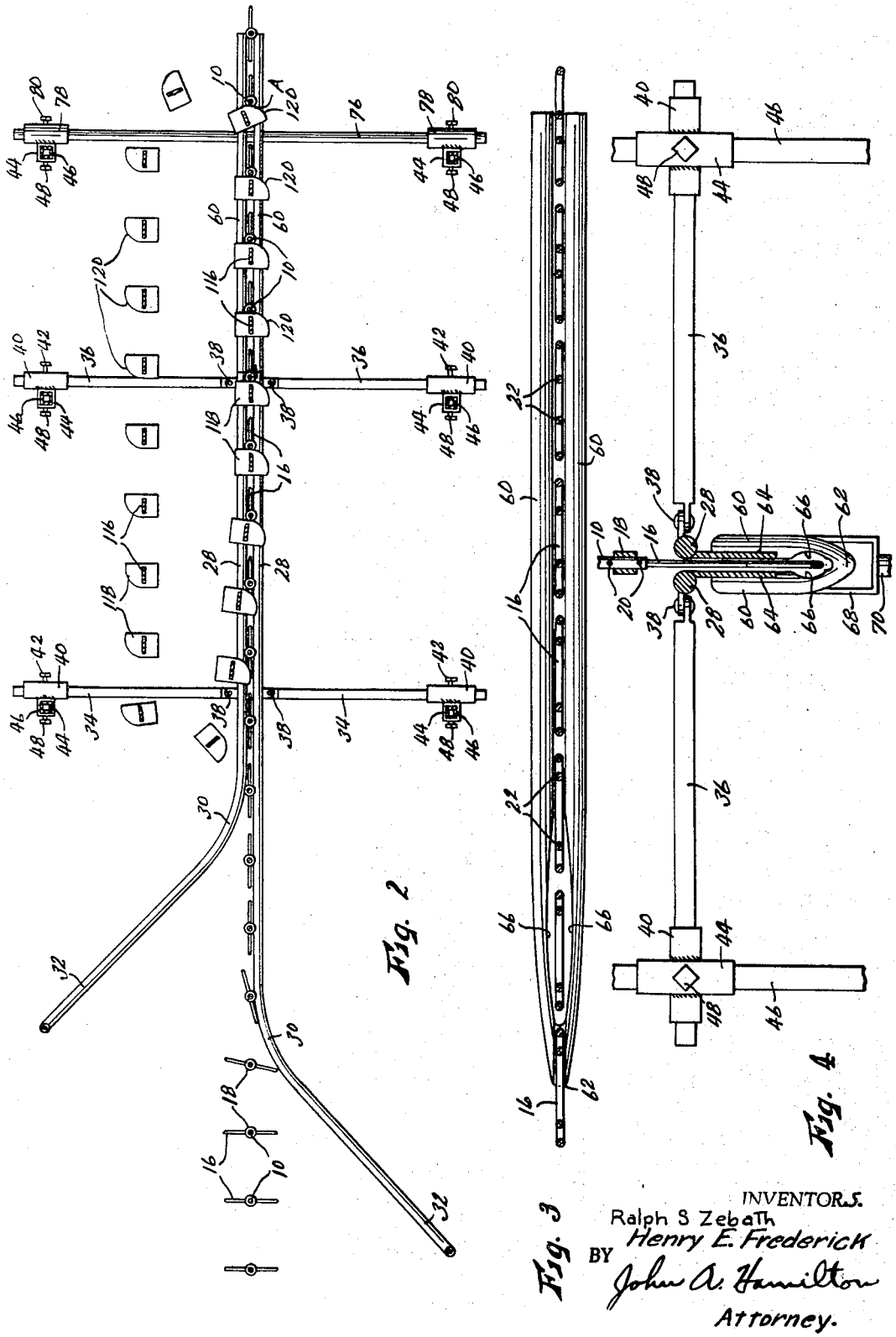

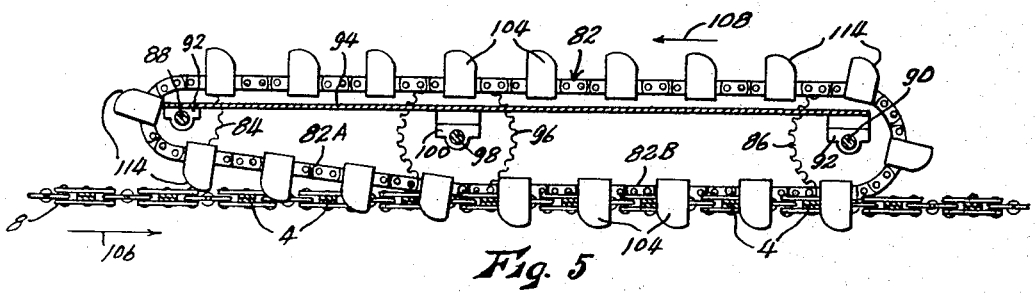
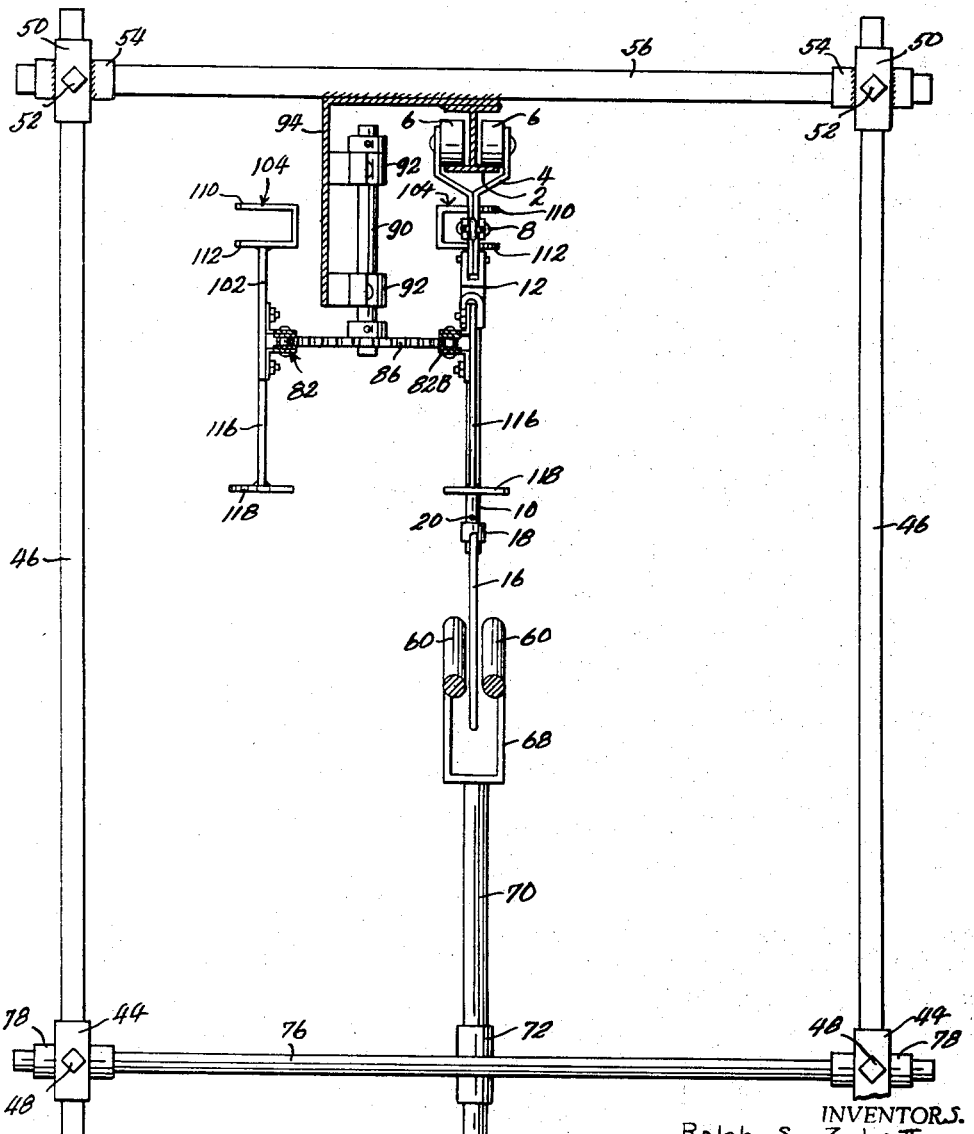
Fig. 5
Fig. 6
INVENTORS.
Ralph S Zebarth
Henry E. Frederick
BY John A. Hamilton
Attorney.

United States Patent Office 3,416,186
Patented Dec. 17, 1968

3,416,186
POULTRY SHACKLE UNLOADING DEVICE
Ralph S. Zebarth, and Henry E. Frederick, Kansas City, Mo., assignors to Ralph Zebarth, Inc., Kansas City, Mo., a corporation of Missouri
Filed June 21, 1966, Ser. No. 559,320
5 Claims. (Cl. 17—11)

ABSTRACT OF THE DISCLOSURE

A device for unloading poultry suspended from shackles on a conveyor line in a poultry processing plant, each of said shackles being generally planar in a vertical plane and having downwardly convergent notches in which portions of a bird's anatomy are engaged and from which said bird may be disengaged by upward movement thereof in said notches, said shackle being suspended by a drop rod pivoted at its upper end to said conveyor, said unloading device comprising a pair of lift rails disposed closely adjacent each side of the path of travel of said shackles and being inclined upwardly in the direction of conveyor travel, a series of stop fingers supported to project horizontally between the drop rods of the shackles engaged between said lift rails to prevent rearward swinging of said drop rods on their pivots, and means operable by said conveyor to move said stop fingers in the same direction and at the same speed as said conveyor.

---

Figure 1:
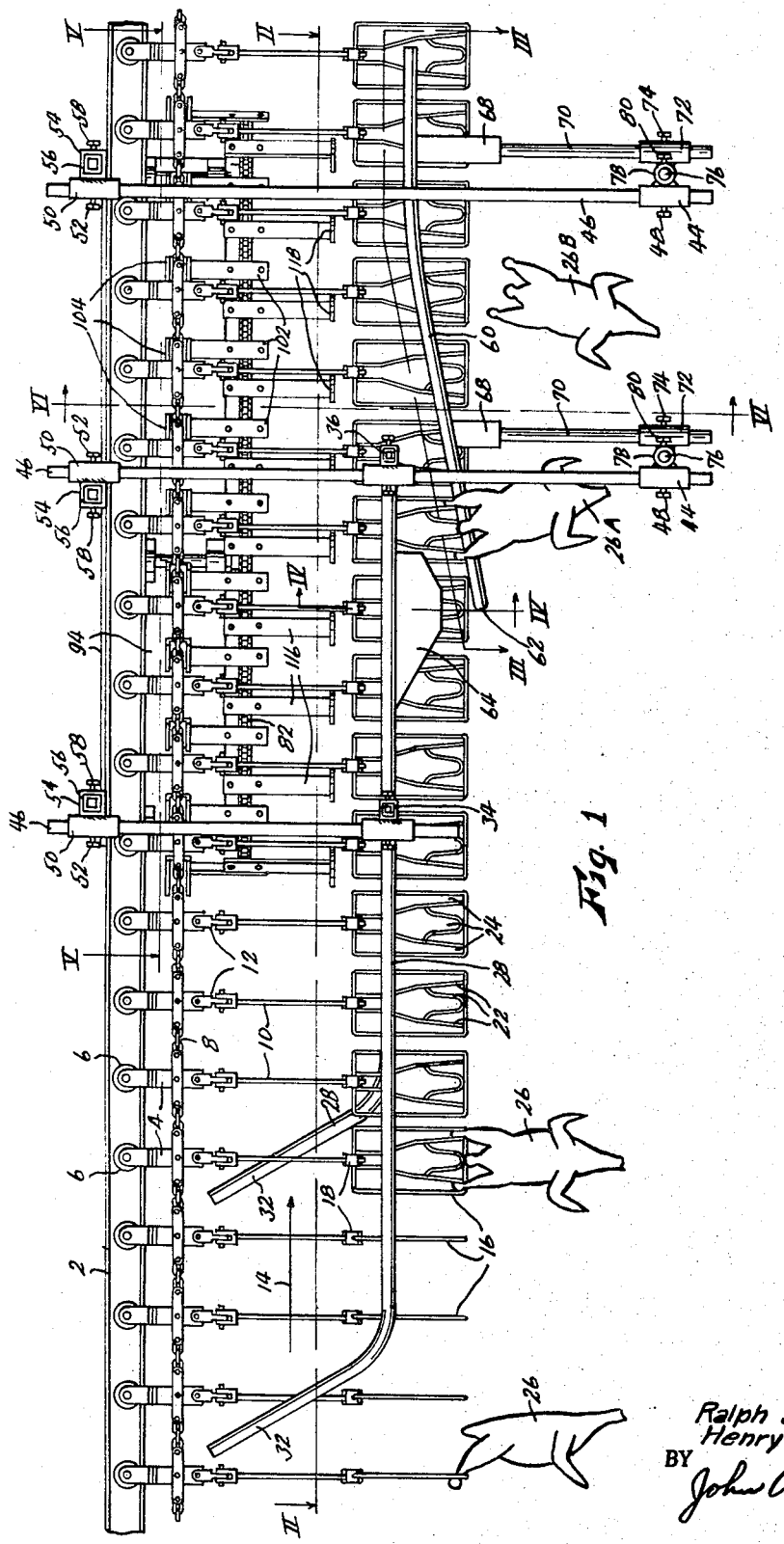

This invention relates to new and useful improvements in poultry processing equipment, and has particular reference to a device for removing poultry from shackles commonly used for supporting said poultry for movement along a conveyor line in various process steps.

In various poultry processing lines (an evisceration line has been selected for purposes of illustrating the invention) each bird is engaged and supported by a shackle supported from the conveyor. The shackle is carried at the lower end of a drop rod or shank, and is swivelled on said rod for free rotation about the rod axis. The resulting freedom of movement of the bird, both laterally and longitudinally of the line of movement, is necessary both for the convenience of the operators performing the evisceration or other steps of the processing, and also for ease and convenience of inspection at various stages of the process. However, this freedom of movement also creates problems in removing the birds from the shackles when desired. The most commonly used shackles are of a type consisting of a planar wire frame having elements arranged therein to form downwardly convergent V-notches adapted to receive therein various portions of the bird's anatomy, such as the feet, hocks, wings or neck, and the bird therefore must be elevated relative to the shackle to free it from the notches thereof. This lifting operation is not a simple one when the shackle is swivelled and universally pivoted and hence free to rotate or move horizontally in any direction, due to the difficulty of holding the shackle firmly against such rotation or horizontal movement to provide resistance as the bird is elevated from the shackle notches, while at the same time permitting the shackle to move along the conveyor line at its normal speed.

The principal objects of the present invention are, therefore, bound up in the provision of an unloading device for shackles of the type described which performs efficiently and dependably under virtually any conceivable conditions, and entirely automatically, to disengage and drop the birds from the shackles at any desired station. Generally, the device includes means for rotating the shackles into the vertical plane of movement and securing them against swinging movement laterally of said plane, means for introducing a stop behind each shackle drop rod to prevent rearward swinging movement, said stop being driven forwardly at the same rate of speed as the conveyor, and means for applying an upward and rearward force to the bird directly adjacent a face of the shackle, whereby to hold the drop rod against its moving stop and to elevate the bird from the shackle notches. The last named force applying means constituting fixed, forwardly and upwardly inclined rails, may be disposed adjacent both sides of the shackle plane, so that it makes no difference which side of the shackle the bird depends from.

Another object is the provision of a poultry shackle unloading device of the character described wherein said moving stops are powered and driven by the conveyor itself, thereby insuring accurate and automatic synchronization therebetween, despite variations, stoppages, and irregularities of the conveyor.

A further object is the provision of a poultry shackle unloading device of the character described which will function efficiently in connection with shackles of standard and ordinary design. Various solutions to the unloading problem have been heretofore proposed, but virtually all of these solutions have involved the use of special shackles, and have hence, been relatively complicated and expensive.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a side elevational view of a portion of a poultry conveyor line, with a shackle unloading device embodying the present invention applied operatively thereto, with birds engaged in certain of the shackles to illustrate the operation of the device, FIG. 2 is a sectional view taken on line II—II of FIG. 1, FIG. 3 is an enlarged, fragmentary sectional view taken on line III—III of FIG. 1, FIG. 4 is an enlarged, fragmentary sectional view taken on line IV—IV of FIG. 1, FIG. 5 is a fragmentary sectional view taken on line V—V of FIG. 1, and FIG. 6 is an enlarged sectional view taken on line VI—VI of FIG. 1.

Like reference numerals apply to similar parts throughout the several views, and the numeral 2 applies to a conveyor track, said track constituting a steel I-beam which extends horizontally and which is rigidly supported by any suitable means, not shown. Supported by said track are a continuous series of shackle yokes 4, each of said yokes having mounted rotatably thereon a pair of rollers 6 engaging the lower flange of said track. The axes of said rollers are horizontal and transverse to the track. Said yokes depend beneath the track, and are connected at a point below said track by a flexible conveyor chain 8, said chain being parallel to and beneath the track. Said chain serves to maintain the yokes in uniformly spaced apart relation along the track, and is longitudinally driven by any suitable means, now shown, whereby to move the yokes along the track, in the direction of arrow 14 in FIG. 1.

Each yoke 4 also extends below chain 8, and the upper end of a drop rod or shank 10 is attached to the lower end of each yoke by means of a universal pivot joint 12, whereby said drop rod can normally swing freely in any direction. Carried at the lower end of each drop rod is a poultry shackle 16. As best shown in FIG. 1, each shackle constitutes an open rectangle formed of heavy wire or rod stock with its major axis disposed vertically and coaxially with drop rod 10. Said shackle has a sleeve 18 affixed to the upper end thereof, said sleeve being mounted rotatably on the lower end of the associated drop rod and secured thereon by a pair of pins 20 inserted through said drop rod respectively above and below said sleeve. Welded within each shackle frame, substantially in the plane thereof, are a plurality of rods or wires 22, the arrangement of said rods being subject to variation but having the general function of forming, either in conjunction with the frame or independently thereof, a plurality of downwardly tapered notches 24 (see FIG. 1) into which various portions of a bird's anatomy may be inserted for suspension thereof from the shackle. Birds are commonly supported in several different ways, depending on the processing steps to be performed, and on other factors. For example, they may be suspended from the shackle by their feet if said feet are still attached to the carcasses, or by the hock joints if the feet have been removed, or by their necks if the heads are still attached to the carcasses, or in some cases by their wings. In the drawing, the birds 26 are shown suspended by the hock joints. Whatever portion of the bird's anatomy is engaged, it will be seen that notches 24 engage a reduced or "necked" portion or portions of the bird, with some enlargement (the hock joints as shown) disposed at one side of the plane of the frame, and with the major portion of the carcass depending from the opposite side of the frame. The bird is secured by virtue of the fact that its weight wedges its engaged portions downwardly in tapered notches 24, and it will be obvious that it can be released only by elevating it relative to the shackle to a height at which notches 24 are of sufficient width to permit the passage of the hock joints therethrough.

The shackle unloading device as contemplated by the present invention includes a pair of guide rails 28 extending horizontally and generally parallel to the path of shackle travel, in closely spaced relation at opposite sides of said path, and at an elevation intermediate the upper and lower ends of the shackles. Said guide rails are curved outwardly at the ends thereof between which the shackles enter, as indicated at 30 in FIG. 2, whereby they will, if the shackles have been swivelled out of the vertical plane of movement as shown at the left side of FIGS. 1 and 2, swivel said shackles back into the vertical plane of travel. The remaining portions of the guide rails between which the shackles travel are generally parallel and spaced closely to the opposite sides of the shackles, so that said shackles cannot swivel, or swing laterally, to any appreciable degree. Also, it will be seen that the extreme end portions 32 of guide rails 28, at the ends of said rails between which the shackles enter, are turned upwardly. This provides that if a shackle should be swinging laterally to a considerable degree as it approaches the guide rails, it cannot swing outside of either rail, but will be engaged and deflected into its proper path between the rails.

Each of guide rails 28 is supported by a pair of arms 34 and 36 spaced apart along the length thereof. As best shown in FIGS. 2 and 3, each of said arms is connected to the associated guide rail by a vertical pivot 38, and extends horizontally outwardly therefrom, its outer end portion being slidable in a sleeve 40 and fixable therein by a set screw 42. Welded to each sleeve 40 is a vertical sleeve 44 which is slidable on a vertical post 46 and fixable thereon by a set screw 48. The upper end portion of each of said posts is slidable in a sleeve 50 (see FIG. 1) and fixable therein by a set screw 52. Welded to each sleeve 50 is a horizontal sleeve 54, the two sleeves 54 being slidable on the respectively end portions of a beam 56, and fixable thereon by set screws 58. Beams 56 extend horizontally and laterally across the top of conveyor track 2 and are rigidly attached thereto as by welding. By means of the adjustments provided by the mounting just described, the spacing between the guide rails may be adjusted to shackles of various thicknesses normal to their planes, the elevation of the guide rails may be adjusted, which may be desirable to adjust the unloader to shackles suspended from drop rods of various lengths, and the lateral spacing between posts 46 may be adjusted to permit the birds to pass therebetween. Particularly if the birds are suspended by their wings, the carcasses may ride relatively high in the shackle so as to pass between the posts, so that larger birds may require a wider post spacing. Also, pivots 38 permit an adjustment of the angularity of the guide rails, for example to provide a wider spacing thereof at their entry ends, which may be desirable under some circumstances.

The unloading device also includes a pair of lift rails 60 extending along the path of travel of the shackles, generally "downstream" of guide rails 28, said lift rails being parallel along the major portions of their lengths, and having the same spacing therebetween as between the guide rails. The ends of said lift rails between which the shackles enter are disposed vertically beneath the exit end portions of guide rails 28, and are curved gradually together as best shown in FIG. 3 to form a point 62 directly in the vertical plane of the shackles, and disposed just below the lower ends of the shackles. Therefore, as each shackle moves along between guide rails 28, it passes over the point 62 of the lift rails, and passes thence between the lift rails as best shown in FIGS. 2–4 and 6.

The shackles must be guided with considerable accuracy to enter between the lift rails with no danger of striking them, and this guiding function is supplied primarily by guide rails 28. However, to prevent any possible lateral tilting of the shackles about the guide rods as fulcrums, which could occur either as a result of looseness of swivel sleeves 18 on drop rods 10, or due to lateral rocking of the yokes 4 on track 2, there are provided a pair of plates 64 (see FIGS. 1 and 4) affixed respectively to the two guide rails and depending therefrom with a spacing therebetween equal to the guide rail spacing. These plates are positioned to engage a considerable vertical span of each shackle at the very moment it is passing over point 62 of the lift rails and entering therebetween, thereby serving as means for preventing any appreciable lateral displacement of the lower end of said shackle. As further insurance, the confronting portions of the lift rails 60, just behind point 62, are arcuately relieved as indicated at 66 in FIGS. 3 and 4, in order to provide an enlarged mouth for the entry of the shackles. The lift rails are inclined upwardly from point 62 thereof in the direction of shackle travel, to an elevation of said shackles corresponding to the upper ends of notches 24 of said shackles.

The lift rails are rigidly affixed respectively to the upper ends of a pair of bifurcated yokes 68, said yokes being spaced apart along the lengths of said lift rails. The bifurcations of said yokes extend beneath the level of points 62 of the lift rails, in order not to interfere with the passage of the shackles between said rails. Each yoke is fixed to the upper end of a post 70 the lower end portion of which is slidable in a sleeve 72 and fixable therein by a set screw 74. Said sleeve is affixed as by welding to the midpoint of a transversely extending horizontal bar 76, the end portions of which are horizontally slidable and axially rotatable in a pair of tubular sleeves 78, and fixable therein by set screws 80. Sleeves 78 are each welded to a vertical sleeve 44 which in turn is supported by a post 46 and beam 56 in precisely the same manner as in the support of guide rails 28, corresponding numerals being used to indicate corresponding parts. In fact, the beam 56 and posts 46 used to support the exit ends of the guide rails may also be used to support the entry or point end of the lift rails, and the structure is so shown. By means of the adjustable elements of their supports, both the elevation and inclination of the lift rails may be adjusted.

In operation, it will be seen that as each shackle 16 enters between lift rails 60 as previously described, the depending portion of the bird 26 carried thereby is engaged by the smoothly curved portion of one of the other of said lift rails just behind point 62, and is deflected thereby laterally outwardly to move slidably along the outer edge of said lift rail. The bird then has the position shown at 26A in FIG. 1. It of course makes no difference which side of the shackle the bird hangs from, since the two lift rails are effective at respectively opposite sides of the shackles. As each bird is thence moved along the length of the lift rails, the upward inclination of said rails causes them to exert an upward force on the bird directly adjacent the shackle. Hence, so long as the shackle is braced against rearward swinging on its U-joint 12, the bird will be elevated gradually in tapered notches 24 of the shackle to a point at which said notches are sufficiently wide to permit the hock joints to pass therethrough, whereupon the bird falls free of the shackle as indicated at 26B in FIG. 1, usually falling to a conveyor for transportation to other stations for further processing. Both the shackles themselves and lift rails 60 should be smooth and polished to avoid scratching, scraping or other injury to the poultry carcasses.

As pointed out above, it is necessary that each shackle be braced against swinging to the rear in its plane of travel, on its universal joint 12, during the time it is passing between lift rails 60, in order to counteract the upward and rearward force exerted thereon by the bird carried thereby as said bird is elevated by said lift rails. Furthermore, while the shackles can be and are braced against swiveling and lateral swinging by fixed guide members (the guide and lift rails), any braces or stops provided to prevent rearward swinging of the shackles in their plane of movement must inherently be travelling members, since the movement of the conveyor cannot practically be halted. For this purpose, we have provided an endless, heavy sprocket chain 82 positioned to move in an elongated horizontal loop intermediate the vertical elevations of conveyor chain 8 and the upper ends of shackles 16. Said loop is disposed immediately adjacent one side of the line of travel of the drop rods 10, and longitudinally of the conveyor. It spans the length of the parallel portions of guide rails 28 and the inclined portions of lift rails 60. Said chain is trained about a sprocket wheel 84 (see FIG. 5) disposed "upstream" of the conveyor and a sprocket wheel 86 disposed "downstream" of the conveyor, said sprockets being mounted respectively on vertical shafts 88 and 90 journalled in bearings 92 affixed to a bracket 94 welded or otherwise affixed to track 2, as best shown in FIG. 6. Intermediate sprockets 84 and 86 chain 82 is trained about a third sprocket 96 also mounted on a vertical shaft 98 journalled in bearings 100 mounted on bracket 94. The diameters of the various sprockets are such as to provide chain 82 with a straight reach 82A which gradually approaches the vertical plane of the shackles at a very acute angle, this reach being intermediate sprockets 84 and 96, and a straight reach 82B parallel to and immediately adjacent the vertical plane of the shackles, this reach extending between sprockets 96 and 86, as best shown in FIG. 5.

Fixed to chain 82 at uniform intervals therealong, equal to the spacing of yokes 4 on chain 8, are a series of upwardly extending standards 102, said standards of course being disposed at the outer periphery of said chain as shown in FIG. 6 so as not to interfere with the engagement of the chain with its sprockets. To the upper end of each standard is affixed on outwardly opening U-shaped finger 104. Said fingers are of such length, horizontally, that the fingers carried by chain reach 82B interdigitate between yokes 4 of the conveyor (see FIG. 5), whereby said yokes engage said fingers and thereby cause chain 82 to move at exactly the same linear speed as conveyor chain 8. Thus, in FIG. 5, chain 8 moves in the direction of arrow 106, and chain 82 moves in the direction of arrow 108. As best shown in FIG. 6, the upper and lower legs 110 and 112 of each finger 104 engage its associated yoke 4 respectively above and below chain 8. This minimizes any tendency of said finger, by its reactive force against the yoke, to cause tilting of the yoke in its plane of movement on rollers 6. The acute angularity of chain reach 82A relative to the shackle plane is necessary to prevent interference between fingers 104 and yokes 4 as the former interdigitate between the latter. The outer ends of the fingers, being disposed radially outwardly from chain 82, have a larger radius of movement than the chain and would abut the yokes if they entered between the yokes at the point chain 82 leaves sprocket 84. However, by angling reach 82A of the chain acutely as shown, and by arcuately relieving the trailing edges of finger legs 110 and 112 as shown at 114 in FIG. 5, the engagement of the fingers by the yokes is rendered free and smooth.

Also affixed to chain 82, at intervals equal to the intervals between standards 102 but alternated therebetween, are a series of depending standards 116. To the lower end of each standard 116 is affixed a stop finger 118 consisting of a flat plate. Fingers 118 are disposed at the vertical elevation of the lower end portions of drop rods 10, but above shackle swivels 18, as shown in FIG. 1, and are operable to interdigitate between said drop rods in the same manner as fingers 104 between yokes 4. However, the relationship of fingers 104 and 118, longitudinally of chain 82, is such that while fingers 104 are disposed ahead of yokes 4 so as to be driven thereby, fingers 118 are disposed behind drop rods 10 whereby to maintain said drop rods vertical and to prevent them from being swung rearwardly by the action of lift rails 60 on the birds 26 held in the shackle. It is desirable that each shackle be disposed between parallel portions of guide rails 28 before fingers 118 engage the drop rods. This tends to damp out longitudinal as well as lateral swinging of the shackles and drop rods, and has been found effective to prevent any possibility that if a drop rod happens to be swung rearwardly at the moment its corresponding finger 118 enters the vertical plane of normal movement of the drop rod, said drop rod might be engaged behind instead of in front of said finger. There is no problem of interference between fingers 118 and drop rods 10 as the latter are initially engaged by the former, although the fingers do approach the drop rods at an acute angle since they are also carried by angled chain reach 82A. However, the leading edge of each finger 118 is arcuately relieved as indicated at 120 in FIG. 2 in order to prevent interference of the drop rod with movement of the finger as the latter leaves the vertical plane of the drop rods as chain 82 engages sprocket 86. This action is illustrated at point A in FIG. 2. It will be obvious that since stop fingers 118 are in effect driven directly by conveyor chain 8, there can be no problem of maintaining synchronization therebetween, and that said fingers will automatically and accurately be positioned properly to be engaged by drop rods 10, despite any irregularities or variation in the speed of conveyor chain 8, or intermittent stoppages thereof. Even the "lengthening" of the conveyor chain in extended periods of usage, which can be of considerable extent in a long conveyor due to wear of the various links and pins included therein, cannot harmfully affect the present device. At most it could result in the fact that only one of fingers 104 was actually effective at any one time, but the unloader would still function efficiently, and would not result in interference between others of yokes 4 and fingers 104 since only a short length of the conveyor chain is involved. For the same reason, even substantial lengthening of the conveyor chain could not displace any of fingers 118 relative to their associated drop rods 10 to a degree capable of causing any malfunction. Chain 82 should be heavy and strong, whereby to support standards 102 and 116 rigidly. Standard and non-inventive means could also be employed for tightening chain 82 to a substantial degree of tension.

The operation of the device is believed to have been fully described in the course of the specification. The most important single feature of the invention is the provision of stop fingers 118 and the novel means of propelling the same to accomplish their function. It is believed that the entire invention can best be summarized as the combination, with a poultry conveyor including a series of shackles supported for movement along a track, means for driving said shackles along said track, each of said shackles being supported for universal pivotal movement and swivelling, and adapted to carry a bird which can be released therefrom by lifting said bird relative to the shackle, said shackle being planar with its plane including its swivelling axis, of an unloading device comprising a pair of fixed lift rails disposed at opposite sides of the path of travel of said shackles and being adapted to receive said shackles therebetween when the planes of said shackles are disposed in the vertical plane of conveyor movement, said lift rails being inclined upwardly in the direction of travel whereby to elevate each bird relative to its associated shackle, fixed guide means disposed adjacent the path of travel of said conveyor and operable to prevent lateral swinging of said shackles and to swivel the planes of said shackles into their vertical plane of movement, whereby said shackles are entered between said lift rails, stop fingers projecting between said shackles transversely to their vertical plane of travel, and means for moving said stop fingers in the same direction and at the same speed as said shackles, whereby to prevent rearward swinging movement of said shackles.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. In combination with a poultry conveyor including a horizontal track, a series of yokes supported by rollers on said track at generally uniform intervals therealong, a driven conveyor chain disposed beneath and parallel to said track and connected to each of said yokes whereby said yokes are moved continuously along said track, a drop rod universally pivoted at its upper end to each of said yokes, and a shackle carried at the lower end of each of said drop rods for swivelling about the axis of said drop rod, said shackle being generally planar with its plane including the axis of said drop rod and having downwardly tapered notches formed therein into which portions of bird's anatomy may be downwardly wedged to secure said bird in said shackle, and from which shackle the bird may be disengaged by raising it upwardly in said notches, a shackle unloading device comprising:

(a) guide means carried fixedly adjacent the vertical plane of the horizontal path of travel of said shackles and positioned to engage said shackles whereby to swivel said shackles on said drop rods to move the planes of said shackles into the vertical plane of said path of travel and to prevent swinging of said drop rods on their universal pivots transversely to said path of travel, (b) a pair of lift rails carried fixedly at respectively opposite sides of said path of travel of said shackles and spaced apart a distance slightly greater than the thickness of said shackles normally to their planes, said lift rails being parallel to said path of travel and having one matching pair of ends thereof disposed lower than the lower ends of said shackles, and being inclined upwardly in the direction of shackle travel to an elevation at least as high as the upper ends of said tapered shackle notches, said guide means serving to introduce said shackles between said lift rails, (c) a series of stop fingers supported to project horizontally between the drop rods of the shackles engaged between said lift rails, so that each finger engages the trailing side of one drop rod to prevent rearward swinging thereof on its universal pivot, and (d) driving means for moving said fingers uniformly and continuously in the same direction and at the same speed as said conveyor chain, said driving means comprising a bracket fixedly supported adjacent said vertical plane of shackle travel, a plurality of sprockets carried for rotation on vertical axes by said bracket and spaced apart longitudinally of said conveyor, an endless drive chain trained about said sprockets whereby to form a horizontal loop having a reach thereof extending horizontally parallel to and directly adjacent said vertical plane of shackle travel, said parallel reach generally spanning the horizontal length of said lift rails, said stop fingers being affixed to said drive chain at intervals therealong equal to the intervals between said yokes on said conveyor chain and projecting horizontally outwardly whereby the fingers on said parallel reach of said drive chain interdigitate between successive drop rods, and means interconnecting said drive chain with said conveyor chain whereby the former is driven by the latter at an equal speed.

2. The combination as recited in claim 1 wherein said means interconnecting said drive chain with said conveyor chain comprises:

(a) a plurality of drive fingers mounted on said drive chain at intervals therealong equal to the intervals between said yokes on said conveyor chain, and extending horizontally outwardly whereby the drive fingers carried by said parallel reach of said drive chain interdigitate between said yokes, whereby said drive fingers are engaged and moved by said yokes to move said drive chain.

3. The combination as recited in claim 2 wherein the spacing of said drive fingers and stop fingers longitudinally of said drive chain is such that when the trailing edge of any one of said drive fingers is engaged by the leading edge of any one of said yokes, and the drop rod of said one yoke is depending vertically therefrom, the leading edge of one of said stop fingers will be positioned to engage the trailing edge of the drop rod of said one yoke.

4. The combination as recited in claim 2 wherein each of said drive fingers is bifurcated with the bifurcation thereof opening outwardly so as to vertically span said conveyor chain when said finger is interdigitated between said yokes, whereby said finger is engaged by said yoke both above and below the point of attachment of said conveyor chain to said yoke, thereby minimizing any tendency of said finger to tilt said yoke in the vertical plane of shackle travel.

5. The combination as recited in claim 2 wherein said sprockets supporting said drive chain are so disposed as to provide said drive chain additionally with a straight reach approaching the vertical plane of shackle travel at an acute angle, whereby said drive fingers move into interdigitating relationship with said yokes as said fingers transverse said acutely angled belt reach, thereby preventing interference between said drive fingers and said yokes during said interdigitation.

References Cited

UNITED STATES PATENTS

| | | | |
|---|---|---|---|
| 3,042,186 | 7/1962 | Varney | 17—11 X |
| 3,103,694 | 9/1963 | Zebarth et al. | 17—11 |
| 3,325,966 | 6/1967 | Bruce et al. | 198—179 X |

FOREIGN PATENTS 138,347   10/1961   U.S.S.R.

LUCIE H. LAUDENSLAGER, *Primary Examiner.*

U.S. Cl. X.R.

17—44.1; 198—131, 179, 185